United States Patent
Laverone et al.

(10) Patent No.: US 8,291,429 B2
(45) Date of Patent: Oct. 16, 2012

(54) ORGANIZATION OF HETEROGENEOUS ENTITIES INTO SYSTEM RESOURCE GROUPS FOR DEFINING POLICY MANAGEMENT FRAMEWORK IN MANAGED SYSTEMS ENVIRONMENT

(75) Inventors: Craig Anthony Laverone, Sunnyvale, CA (US); David Lynn Merbach, Rochester, MN (US); Sumant Padbidri, San Jose, CA (US); Ramani Ranjan Routray, San Jose, CA (US); Prasenjit Sarkar, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 875 days.

(21) Appl. No.: 12/411,144

(22) Filed: Mar. 25, 2009

(65) Prior Publication Data

US 2010/0251252 A1 Sep. 30, 2010

(51) Int. Cl.
*G06F 9/50* (2006.01)
(52) U.S. Cl. ...................................... 718/104
(58) Field of Classification Search ........................ None
See application file for complete search history.

(56) References Cited

U.S. PATENT DOCUMENTS

| | | | | |
|---|---|---|---|---|
| 7,043,619 B1* | 5/2006 | Knight | ...................... | 711/170 |
| 7,065,616 B2 | 6/2006 | Gajjar et al. | | |
| 7,401,137 B1* | 7/2008 | Gasser et al. | ............... | 709/223 |
| 2002/0143942 A1* | 10/2002 | Li et al. | ...................... | 709/225 |
| 2003/0225801 A1* | 12/2003 | Devarakonda et al. | ....... | 707/205 |
| 2004/0243692 A1* | 12/2004 | Arnold et al. | ............... | 709/220 |
| 2004/0243699 A1 | 12/2004 | Koclanes et al. | | |
| 2005/0049884 A1* | 3/2005 | Hunt et al. | ...................... | 705/1 |
| 2005/0149940 A1* | 7/2005 | Calinescu et al. | ............. | 718/104 |
| 2005/0268325 A1* | 12/2005 | Kuno et al. | ...................... | 726/1 |
| 2007/0283119 A1* | 12/2007 | Sarkar et al. | .................. | 711/170 |
| 2009/0265450 A1* | 10/2009 | Helmer et al. | ............... | 709/221 |

OTHER PUBLICATIONS

IBM (IBM Tivoli Storage Resource Manager: A Practical Introduction); IBM Redbooks; 554 pages; Aug. 2003.*
Storage Management: "Visibility, control and mobility for critical business information", Symantec, 2006.
"Hitachi HiCommand Storage Services Manager Software", Partner Beyond Technology, Hitatchi Data Systems Corporation, 2006.
Dakashi Agrawal et al., "Policy-Based Validation of SAN Configuration", IBM, 2004.

* cited by examiner

*Primary Examiner* — Keith Vicary
(74) *Attorney, Agent, or Firm* — Griffiths & Seaton PLLC (57) ABSTRACT

A method, system, and computer program product for implementing policies in a managed systems environment is provided. A plurality of the heterogeneous entities is organized into a system resource group (SRG). Each of the plurality of heterogeneous entities is visible to an application operable on the managed systems environment. The system resource group is subject to at least one membership requirement, defines a relationship between at least two of the heterogeneous entities, contains at least one policy defining an operation as to be performed on the system resource group for a domain of the managed systems environment, and defines at least a portion of a policy framework between the system resource group and an additional system resource group organized from an additional plurality of the heterogeneous entities. The system resource group expands according to an action performed incorporating the relationship, policy, or policy framework.

20 Claims, 6 Drawing Sheets

ORGANIZATION OF HETEROGENEOUS ENTITIES INTO SYSTEM RESOURCE GROUPS FOR DEFINING POLICY MANAGEMENT FRAMEWORK IN MANAGED SYSTEMS ENVIRONMENT

BACKGROUND OF THE INVENTION

1. Field of the Invention

The present invention relates in general to computers, and more particularly to a method, system, and computer program product for implementing policies in a managed systems environment.

2. Description of the Related Art

A managed systems environment may support attachment of a wide variety of heterogeneous entities, such as host servers, disk array controllers, storage volumes, and client systems. A networked system in the environment may include multiple networks, such as one or more storage area networks (SANs) and/or local area networks (LANs). The networked system may be developed via connections to one or more network switches, forming a fabric through which the entities may communicate. As numerous hardware and software vendors have developed custom storage solutions, applications, and operating system interfaces, problems may arise in attempting to integrate multiple entities in a networked system. For example, a networked system may include host servers executing UNIX® and UNIX-like operating systems (e.g., Solaris®, Linux®, AIX®), Microsoft® Windows®, and IBM® z/OS®.

Networked environments such as the SAN environment are rarely static, necessitating frequent correlation and analysis to understand the relationship between various entities and resources. With the advent of virtualization in managed systems environments, including virtualized storage management, tracking an application's relationship to the entities in the system in dynamic fashion with respect to time can be challenging. Currently there is no mechanism for administrators to holistically correlate the various entities in managed systems environments based on the context of the action being performed (provisioning, resiliency, chargeback, reporting, etc.). The challenge of integration becomes increasingly difficult as the administrator has to frequently deal with growing scope of applications encompassing databases and file systems.

SUMMARY OF THE INVENTION

In view of the foregoing, a need exists for a mechanism to holistically manage and correlate the various entities in managed system environments. Accordingly, in one embodiment, by way of example only, a method for implementing policies for heterogeneous entities in a managed systems environment is provided. A plurality of the heterogeneous entities is organized into a system resource group (SRG). Each of the heterogeneous entities is visible to an application operable on the managed systems environment. The system resource group is subject to at least one membership requirement, defines a relationship between at least two of the heterogeneous entities, contains at least one policy defining an operation as to be performed on the system resource group for a domain of the managed systems environment, and defines at least a portion of a policy framework between the system resource group and an additional system resource group organized from an additional plurality of the heterogeneous entities. All of the heterogeneous entities in the managed systems environment are provided a level of service in the policy framework for tiered management. An action for one of the heterogeneous entities is performed by the application. The action takes into account at least one of the relationship, the at least one policy, and the at least the portion of the policy framework established by the system resource group. The system resource group expands according to a context of the application.

In another embodiment, again by way of example only, a system for implementing policies for heterogeneous entities in a managed systems environment is provided. A policy management module is operational in the managed systems environment. The policy management module is adapted for organizing a plurality of heterogeneous entities into a system resource group (SRG). Each of the plurality of the heterogeneous entities is visible to an application operable on the managed systems environment. The system resource group is subject to at least one membership requirement, defines a relationship between at least two of the heterogeneous entities, contains at least one policy defining an operation as to be performed on the system resource group for a domain of the managed systems environment, and defines at least a portion of a policy framework between the system resource group and an additional system resource group organized from an additional plurality of the heterogeneous entities. All of the heterogeneous entities in the managed systems environment are provided a level of service in the policy framework for tiered management.

In still an additional embodiment, again by way of example only, a computer program product for implementing policies for heterogeneous entities in a managed systems environment is provided. The computer program product comprises a computer-readable storage medium having computer-readable program code portions stored therein. The computer-readable program code portions comprise an executable portion for organizing a plurality of heterogeneous entities into a system resource group (SRG). Each of the plurality of the heterogeneous entities is visible to an application operable on the managed systems environment. The system resource group is subject to at least one membership requirement, defines a relationship between at least two of the heterogeneous entities, contains at least one policy defining an operation as to be performed on the system resource group for a domain of the managed systems environment, and defines at least a portion of a policy framework between the system resource group and an additional system resource group organized from an additional plurality of the heterogeneous entities. All of the heterogeneous entities in the managed systems environment are provided a level of service in the policy framework for tiered management.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict embodiments of the invention and are not therefore to be considered to be limiting of its scope, the invention will be described and explained with additional specificity and detail through the use of the accompanying drawings, in which.

DETAILED DESCRIPTION OF THE DRAWINGS

As previously described, currently administrators face challenges in integrating the many varied entities in managed systems environments. Consider the following exemplary scenario. At a first time T1, the administrator provisions certain storage resources for a database. Later at time T2, when the capacity requirements of the database increases, the administrator allocates additional storage resources for the database, forgetting that he has to increase the storage capacity for backup and replication functions as well. The lack of storage capacity for backup and replication functions will not present itself as a problem immediately. When the problem does arise, however, the administrator is required to trace back all events to the source of the problem, which may incur time and expense.

In a certain managed systems environment, volumes for a particular database are allocated from three different storage resources. The data and log volumes for the database are allocated from the highest quality and most reliable resources, while the index is allocated from a less reliable resource since indices may be recreated. In this situation, the provisioning requirements for the database differ from the replication requirements. In addition, each of the database storage resources are required to be in a same zone (an allocation of resources for device load balancing and for selectively allowing access to data only to certain users) with respect to the host for the database to be usable by applications operating on the host, while the log and data volumes of the database should be categorized into a different zone for replication purposes. This scenario quickly becomes complicated as the number of applications and sites associated with the database increase.

The illustrated embodiments serve to address each of these scenarios by virtue of implementing system resource groups (SRGs). SRGs provide a container mechanism to group together various elements of a managed systems environment, such as a SAN, and attach high-level policies to the various elements. SRGs allow system administrators to identify various violations as they occur, providing for a stable and consistent environment. SRGs are abstract entities that define the relationship between servers (virtual and physical), file systems, databases and storage. The entity enables the capability for group-oriented provisioning actions such as the creation and assignment of volumes from storage subsystems to servers, file systems and databases as well as the network access control between the two (such as zoning). In addition to the above, the SRGs can form the basis of consistency groups for replicating applications in a site or between sites. SRGs can be used to apply container notions to provisioning, chargeback, reporting, disaster recovery, etc.

Entities in a managed environment can be grouped into a SRG by automatic discovery based on the context of a particular application, or by administrative boundary, referring to an administrator grouping entities based on his/her deployment. All of the entities in the managed systems environment are provided a level of service in a policy framework for tiered management. Policies are based on reliability, manageability, device type, chargeback (cost for additional storage resources to be put in place), and the like. Policies may be assigned by a systems administrator graphically, for example, using a graphical user interface (GUI) by leveraging the SRGs presentation of a particular systems relationship, cost, device type, etc. In additional embodiments, policies may be assigned by operation of the SRGs themselves (e.g., by virtue of a relationship established by one or more SRGs).

SRGs holistically capture and maintain each of the relationships between entities. However, based on the context in which SRG is used such as provisioning, resiliency, chargeback, reporting, optimization, migration, etc., SRGs are expanded in that context. For example, a SRG (a payroll application) with an associated replication policy for disaster recovery of data will only expand with respect to the storage volumes used by the application since in this context, all the storage volumes participate in copy relationships. The same SRG, however, when associated with server resiliency policy, will expand in the context of servers and clusters.

Figure 1:
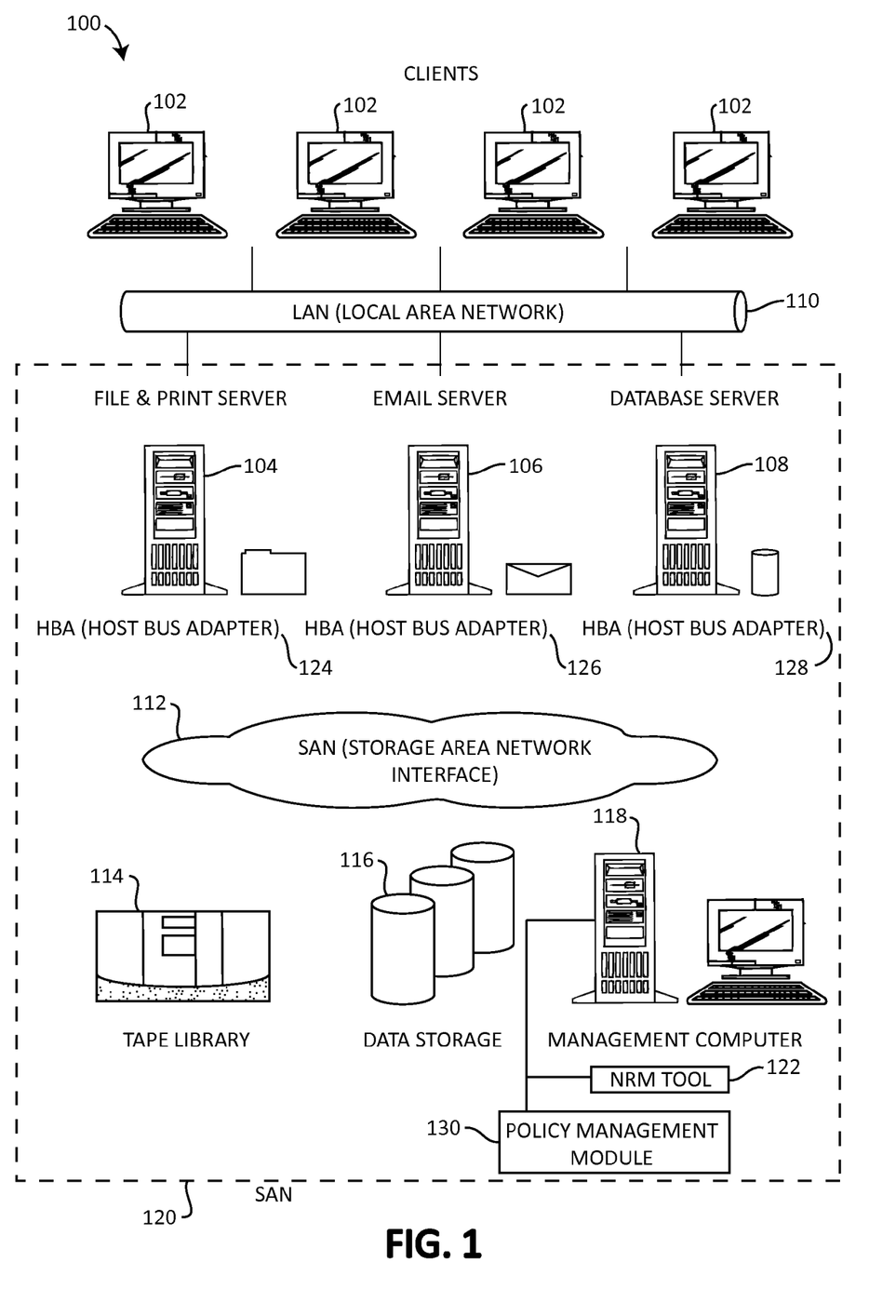
FIG. 1 is a block diagram of an exemplary networked system presented as at least a portion of an exemplary managed systems environment in which aspects of the present invention, including a policy management module, may be implemented.

Turning now to FIG. 1, an exemplary networked system 100 in which aspects of the present invention may be implemented is depicted. Networked system 100 is presented as at least a portion of an exemplary managed systems environment. In exemplary embodiments, the networked system 100 includes clients 102 and servers 104-108 coupled to a local area network (LAN) 110. The networked system 100 further includes a tape library 114 and data storage 116 coupled to a SAN infrastructure 112. A management computer 118 may also be coupled to the SAN infrastructure 112. In exemplary embodiments, the servers 104-108 are coupled to the SAN infrastructure 112 through host bus adapters (HBAs) 124-128. The SAN infrastructure 112 may include any number of switches, routers, hubs, computers, cables, and the like.

In exemplary embodiments, the SAN infrastructure 112 is fibre channel. Through the SAN infrastructure 112 and the HBAs 124-128, the servers 104-108 can read and write data to the tape library 114 and the data storage 116 as requested by the clients 102 via the LAN 110. In exemplary embodiments, each HBA 124-128 has one or more ports that are connected to switch ports on network switches via cables, such as copper wire or fiber optic cables, in the SAN infrastructure 112 to form a SAN fabric. The SAN infrastructure 112 may additionally or alternatively include wireless communication between network entities, such as the HBAs 124-128, the tape library 114, the data storage 116, and the management computer 118. The underlying network topology of the SAN infrastructure 112 may be any topology known in the art and may include connections to other entities not depicted in FIG. 1.

The various entities 104-118 and 124-128, including the underlying entities of the SAN infrastructure 112, may be collectively referred to as a SAN 120. In many cases, entities 104-118 are heterogeneous in nature and are referred to herein as heterogeneous as such, although the skilled artisan will appreciate that heterogeneousness among entities in a particular implementation may vary. While a finite number of heterogeneous entities are depicted in the networked system 100 of FIG. 1, it will be understood that the scope of the invention is not so limited. To the contrary, any size system with any number of servers, HBAs, switches, and storage entities may be supported, such as SANs ranging between 32 to 2500 or more ports. Moreover, the LAN 110 need not be present; however, it will be understood that any size or number of LANs or other network types are considered within the scope of the invention.

The servers 104-108 may be high-speed processing devices (e.g., a mainframe computer) that handle large volumes of processing requests from the clients 102. In exemplary embodiments, the server 104 functions as a file and print server coupled to the SAN infrastructure 112 through one or more ports of the HBA 124. The server 106 may function as an e-mail server coupled to the SAN infrastructure 112 through one or more ports of the HBA 126. In exemplary embodiments, the server 108 functions as a database server coupled to the SAN infrastructure 112 through one or more ports of the HBA 128. The servers 104-108 may further include other functionality not depicted, such as a web server or applications server. The clients 102 may comprise desktop or general-purpose computer devices that generate data and processing requests to the servers 104-108 through the LAN 110. The networks 110 and 120 may be part of an intranet, extranet, or an internetwork, such as the Internet, or a combination thereof. The LAN 110, similar to the SAN infrastructure 112, may include a wireless and/or wireline network infrastructure. The data storage 116 and the tape library 114 may include any number of subsystems, referred to generally as "storage subsystems."

The management computer 118 may be any type of computer known in the art, such as a server, a workstation, a personal computer, or the like. In exemplary embodiments, the management computer 118 executes management software, such as a network resource management (NRM) tool 122, that supports administrative functions including configuring the entities of the system 100. The NRM tool may support configuring entities coupled through and within the SAN infrastructure 112 and/or the LAN 110. The NRM tool 122 executing upon the management computer 118 may also support tracking problems and storing problems and configuration data to one or more databases. The NRM tool 122 may support configuration data and problem tracking for all of the entities of the networked system 100, and are not limited to the SAN 120. A policy management module 130 is operable on the management computer 118. Policy management module 130 may operate independently, or in conjunction with, NRM tool 122. NRM tool 122 and/or policy management module 130 may be configured for implementing aspects of the present invention, such as organizing heterogeneous entities 104-118 into SRGs as will be further explained, following. An administrator may monitor for problems and record problems using NRM tool 122 executing upon management computer 118. Examples of such NRM tools include EMC ControlCenter®, HP® AppIQ®, IBM® TPC™, and Veritas® CommandCentral®. In alternate exemplary embodiments, the management computer 118 is coupled to the LAN 110. While the networked system 100 represents an exemplary networked system, more advanced networks may be supported, such as a network with virtualization at different levels. For example, access to the networked system 100 may be supported through a "virtual machine" instead of the servers 104-108.

Each entity within a managed systems environment, such as the networked system 100, may have a direct attribute, an association, and/or a derived attribute. A direct attribute is an inherent property of the entity. In the case of the servers 104-108, the direct attributes of each server may include: one or more IP addresses, a host name, an operating system, and a memory size among others. In exemplary embodiments, each entity has one or more associations, where an association links one or more types of entities, such as a fabric, a zone, a zone-set, an access control list, or network links. A fabric is a logical network entity that may consist of a set of switches within the SAN infrastructure 112, which act in unison along with the servers 104-108 connected via the HBAs 124-128, together with the storage subsystems, including the data storage 116 and the tape library 114. The management computer 118 may also be part of one or more fabrics. In exemplary embodiments, a zone is a collection of ports in a fabric that are visible to each other, and a zone-set is a collection of zones in the fabric. An access control list may include a set of host ports, storage subsystem ports and storage volumes that indicates a path via which the host may access a volume, such as ports of HBA 124 through which the server 104 may access data via ports and volumes on the data storage 116. In exemplary embodiments, network links are connections between two ports.

Figure 2:
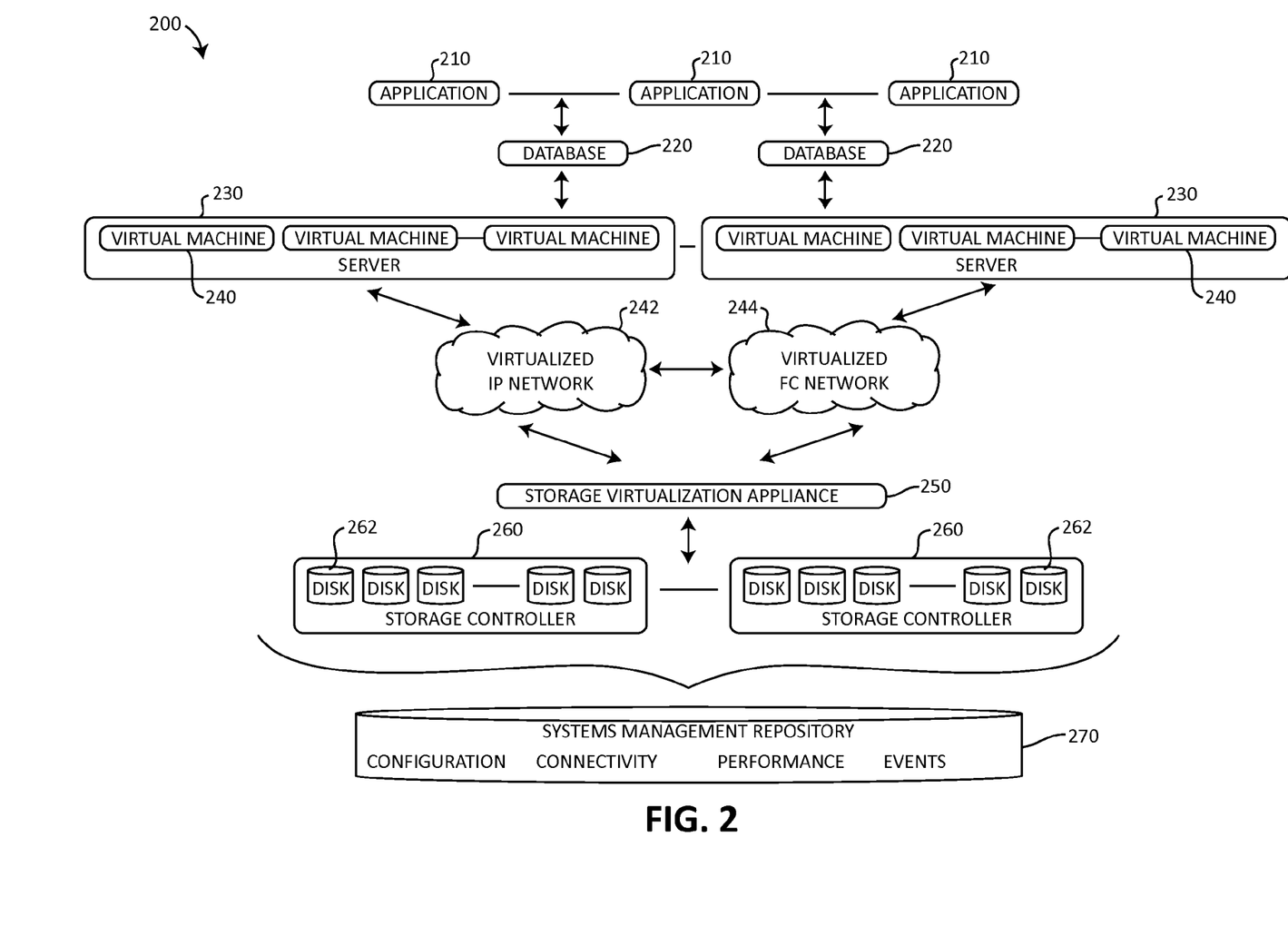
FIG. 2 is a block diagram of an additional exemplary managed systems environment.

Turning to FIG. 2, an additional exemplary managed systems environment 200 is depicted. The various entities 210-270 are presented more generically than the specific embodiment shown in FIG. 1 for conceptual purposes, however the skilled artisan will appreciate that many of the same topologies and structures are similar. Environment 200 includes several applications 210. Applications 210 may vary depending on a particular implementation. Each of the applications 210 leverages one or more databases 220 for information. Below databases 220, a number of servers 230 are implemented. In one embodiment, the servers 230 may host the databases 220 and/or the application 210. As described previously, a particular server 230 may host a particular application 210. In addition, each of the servers 230 may include one or more virtual machine entities 240 operable on the servers 230. Servers 230 are in communication over either, both of, or between a virtualized internet protocol (IP) network 242 and a virtualized fibre channel (FC) network 244 and between a storage virtualization appliance 250. Storage virtualization appliance provides an interface between a number of storage controllers 260, each with physical disks 262, virtual volumes (not depicted) or other storage resources.

For each of the heterogeneous entities in environment 200, information associated with the management of the entities 210-262 are held in a systems management repository 270. This information may include information relating to such characteristics as device configuration, connectivity, performance, and system events as the skilled artisan will appreciate. In one exemplary embodiment, the systems management repository is operable on management computer 118 (FIG. 1) by or in conjunction with NRM tool 122 and/or policy management module 130 (again, FIG. 1).

Figure 3:
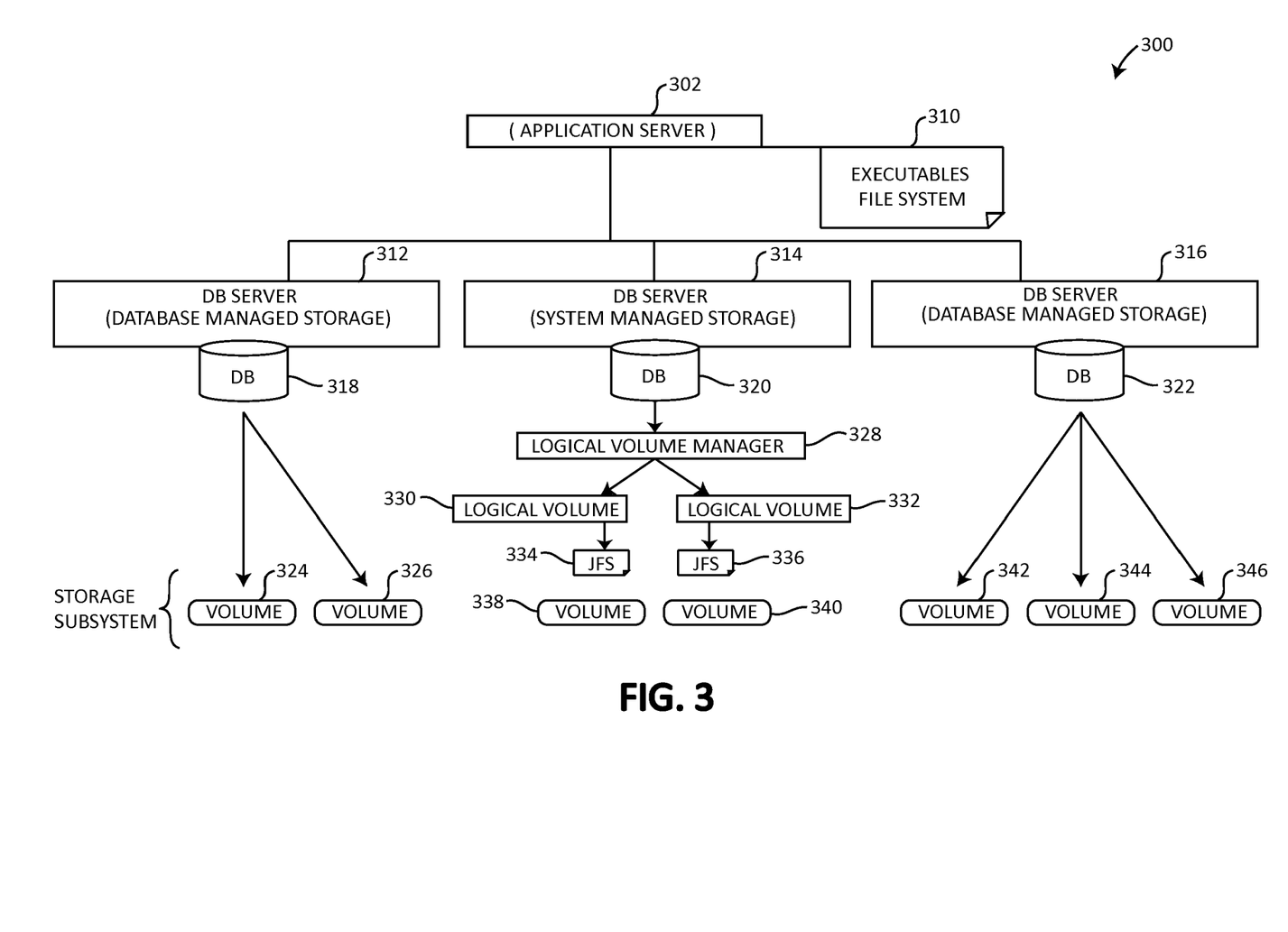
FIG. 3 is a block diagram of an exemplary implementation of a managed systems environment.

A more specific example of a managed systems environment is depicted in FIG. 3, following. Environment 300 more clearly demonstrates the wide variety of heterogeneous entities that may be present in any particular managed systems environment. Environment 300 includes an application server, such as an SAP® application server 302, in which executables 310 using a file system such as an NTFS file system are operable. Application server 302 is in communication with several differing database servers. One database server, such as a Windows® database server 312 manages a database such as an IBM® DB2 database 318 adapted for database managed storage. An additional database such as an AIX® server 314 manages an additional database, such as an additional DB2 database 320 adapted for system managed storage. Finally, an additional server, such as an additional Windows® database server manages an additional database such as an Oracle® database 322 adapted for database managed storage.

Each of the database servers 312, 314, and 316 is associated with a set of storage resources. In the server 312, volumes 324 and 326 are associated with database 318. In one embodiment, volumes 324 and 326 comprise a storage subsystem, such an IBM® DS8000 disk storage subsystem. Database server 316 is similarly associated with volumes 342, 344 and 346. In the case of the database server 314, a logical volume manager 328 manages a pair of logical volumes 330 and 332 associated with journaled file systems (JFS) 334 and 336 and volumes 338 and 340.

The various heterogeneous entities that may be categorized into a system resource group are high-level entities (from a SAN perspective) that are visible to an application operable in the managed systems environment. These high-level entities may include the various entities previously depicted and described, such as file systems, databases and storage volumes (visible to a host). In one embodiment, entities in a storage area network that are dependent on these high-level entities may be automatically included in a system resource group (such as fabric subsystems etc.).

Figure 4:
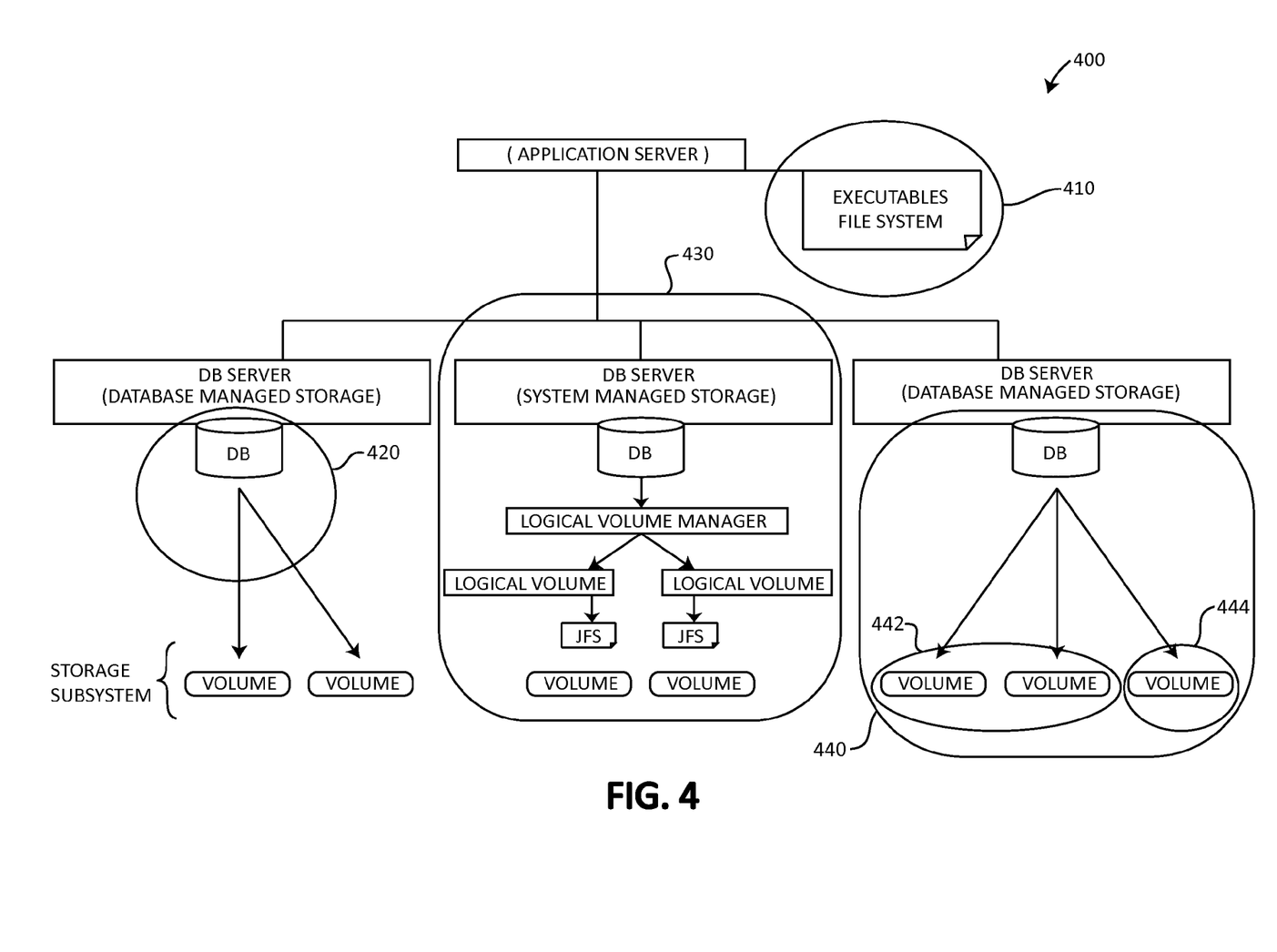
FIG. 4 is a representation of several system resource groups (SRGs) organized from portions of the exemplary implementation depicted in FIG. 3.

Turning to FIG. 4, an environment 400 is depicted, portions thereof having been classified/categorized into various exemplary system resource groups. Environment 400 contains the same specific entities as environment 300 described earlier in FIG. 3. For the executables organized under the depicted file system, SRG 410 is defined/created as a file system (FS) SRG. For the database server adapted for database-managed storage, database (DB) SRG 420 is defined/created. For the database server adapted for system-managed storage, a server SRG 430 is created/defined. Finally, for the database managed storage and associated storage volumes, a custom-database SRG 440 is created/defined with database container SRGs 442 and 444. As the skilled artisan will appreciate, creation/definition of SRGs vary according to the entity or entities in which they are assigned.

Figure 5:
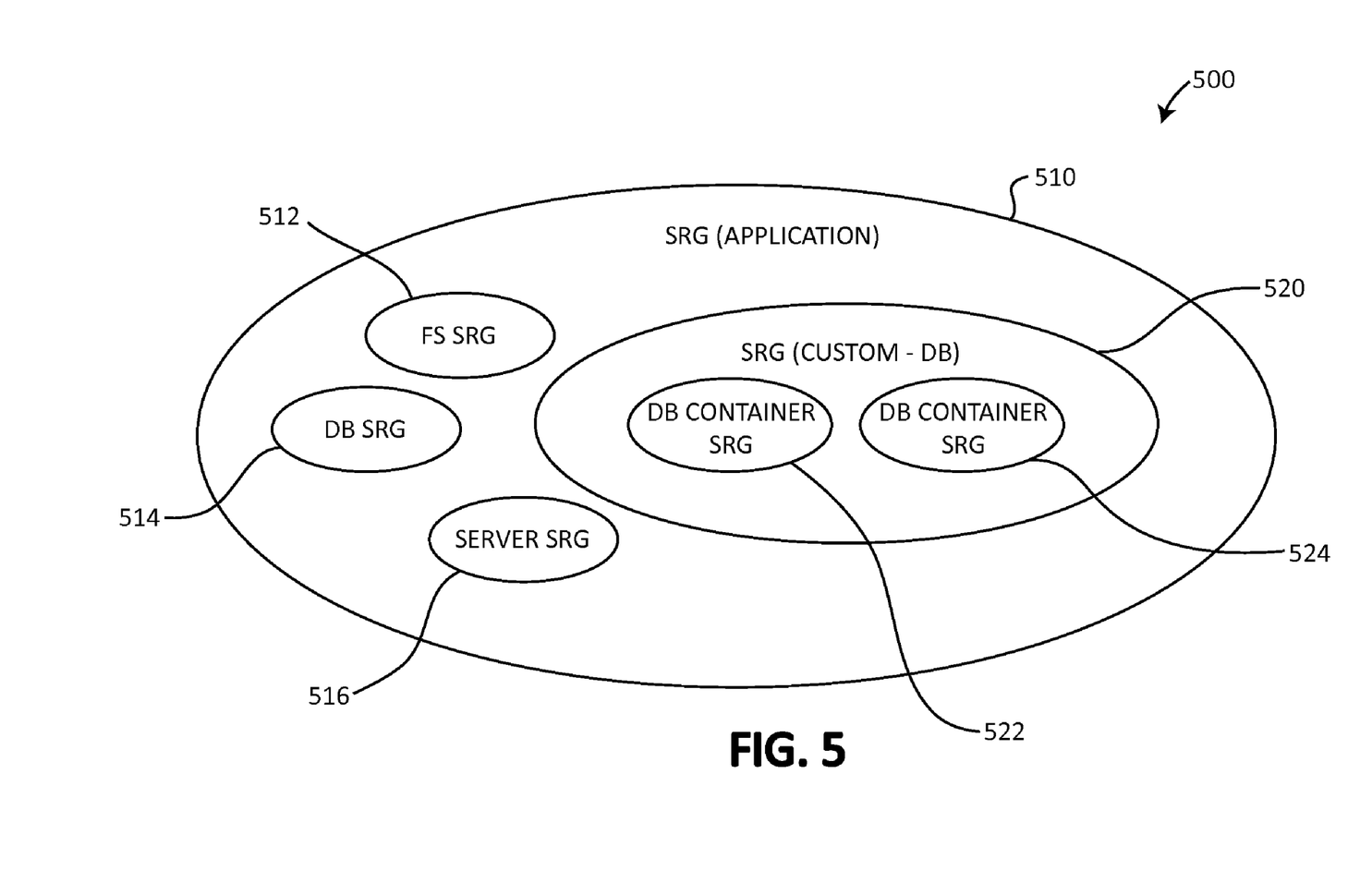
FIG. 5 is an exemplary system resource group (SRG)

This is illustrated more thoroughly in FIG. 5, following in an SRG view 500 of the entities described in FIGS. 3 and 4, previously is depicted. SAP® application SRG 510 is inclusive of each of the remaining SRGs depicted. For example, application SRG 510 is inclusive of FS SRG 512, DB SRG 514, and server SRG 516, corresponding to the hierarchical levels depicted previously in FIGS. 3 and 4. Application SRG 510 becomes a consistency group, integrating and correlating relationships, policies, and membership requirements of children SRGs. Custom-DB SRG 520 includes DB container SRGs 522 and 524. As the view 500 illustrates graphically, the membership requirements, policies, and relationships of each of the SRGs form a framework that relate to other SRGs in the environment as a whole, providing for tiered management of the environment.

System resource groups include policies that define, for example, how provisioning and replication actions operate on a particular system resource group and as a whole in the managed systems environment. Various exemplary domains in the managed systems environment will now be described, including the various policies defined by system resource groups. One exemplary domain concerns creation of volumes. For volume creation, SRG policies may provide an ordered set of storage volumes and storage pools for volumes. The following table of exemplary policy settings may be implemented for volume creation.

TABLE 1

Exemplary Policy Settings for Volume Creation

| | |
|---|---|
| 1. | If the element in the ordered set is a storage volume, no creation is done, but the volume is removed from the set for assignment to the hosts in the system resource group. |
| 2. | If the element is a storage pool, a storage volume of the required size is created from the pool and is made ready for the assignment to the hosts in the system resource group. |
| 3. | If the pool is empty, the pool is removed from the ordered set. |

An additional domain concerns assignment of volumes (pathing). For volume assignment, SRG policies may dictate how the assignment of volumes from a particular system resource group to the hosts in the same group is performed. The policy may be affected by the number of required paths from the host to the volume. In one embodiment, implementation of volume assignment policies is best effort in nature. In other words the implementation will try to achieve the number of required paths as stated by the policy but if that is not possible, then as many paths as possible will be achieved.

An additional domain concerns zoning. Zoning policies describe the zoning between entities, such as between the hosts and storage volumes, or the storage subsystems containing the storage volumes. Possible exemplary policy settings include (1) no zoning, (2), one zone per server, (3) one zone per subsystem, and (4) one zone per system resource group.

An additional domain concerns backups. Backup policies describe, for example, how often the entities in a particular system resource group are to be backed up. In one embodiment, more than one backup policy may be associated with a particular SRG. For example, the SRG may be backed up in an incremental mode nightly, as well as fully backed up on a monthly basis. Table 2, following, depicts exemplary possible backup policy settings.

TABLE 2

Exemplary Policy Settings for Backups

| | |
|---|---|
| 1. | Frequency of Backup (e.g., nightly, weekly, monthly) |
| 2. | Mode of Backup (e.g., online, offline) |
| 3. | Type of Backup (e.g., full, incremental) |

Finally, an additional domain concerns replication. Replication policies may, for example, dictate the mode of replication to be performed for a particular SRG. The mode of replication indicates both the type of replication as well as the role that the SRG performs in this replication. Possible replication policy settings are described following in Table 3.

TABLE 3

Exemplary Policy Settings for Replication

| | |
|---|---|
| 1. | Type of Replication (e.g., FlashCopy, GlobalMirror, MetroMirror, MetroGlobalMirror) |
| 2. | Role played by SRG (e.g., source, target, etc.) |

A challenge in designing a system resource group is that the requirements for provisioning (storage volumes and network) may not match the requirements for replication. For example, consider a database. The consistency group that defines the whole database application in terms of replication includes data files, index files and log files (assuming a file-system oriented database). However, in terms of provisioning, an administrator may want to treat data, index and log files differently because they have different storage requirements. For example, the administrator may want to provide the highest level of protection to log files, the next level of protection to data files (assuming the presence of backups) and the least level of protection for index files (they can be re-generated). To address the challenge described above, a flexible definition of system resource groups may be implemented. SRGs are not intended to model a particular application, but to provide tools so that external agencies may model applications via the SRG application programming interfaces (APIs). The following exemplary definitional/ membership requirements may be established for a system resource group.

(1) A SRG may be composed of file systems, databases, storage volumes, servers (virtual and physical) and other system resource group(s). The recursiveness of system resource groups is deliberately introduced so as to compose system resource groups that can match both provisioning and replication requirements. In another sense, the recursiveness denotes a "gets storage from" relationship, while the elements of a system resource group have common policies or requirements in some domain. (2) A SRG must have at least one element in it. In other words, an empty SRG is not valid. There can be no cycles in the membership of system resource groups. This is a practical imperative.

(3) If a file system, storage volume or database is added to a storage resource group, they must follow the policies associated with the system resource group. (4) Modifying a policy in a SRG may be restricted in some cases. For example, modifying a replication policy may be constrained by applications accessing a system resource group. (5) A file, file system, database, storage volume, server or system resource group may be a member of multiple system resource groups. This does, however, introduce policy complications that are addressed by the requirements set forth in (6), following.

(6) If a system resource group does not have a policy in some domain, it inherits the policy of all the parent system resource groups (if there are parents). If there is any policy conflict among the parents of a system resource group and the system resource group does not have a policy, then the system resource group defaults to a null policy for the domain. Any provisioning or replication action on that system resource group may result in a default action or error. (7) When a provisioning or replication action is invoked on a system resource group, the action is performed on either the system resource group or the nearest system resource group (in terms on node distance) where the action is feasible. This scenario arises when there two entities in an entity hierarchy that are capable of replication, such as an IBM® Storage Volume Controller (SVC) in front of an Enterprise Storage Server (ESS®). For example, if a replication action is invoked on a database system resource group that is hosted on a virtual volume on the SVC, the replication action is invoked on the SVC virtualization machine that hosts the virtual volume and not on the back-end ESS storage subsystem that hosts the physical volumes that make up the virtual volume. A similar example can be construed for file systems.

(8) Replication capabilities may prevent a volume to be part of multiple replication sessions. These restrictions are transitive to the system resource group(s) that may contain the storage volume directly or indirectly. For example, a storage volume can be part of at most two FlashCopy or Peer-to-Peer Redundant Copy (PPRC) relations in early version of the ESS. If the same storage volume is part of three system resource groups, then at most two system resource groups can perform replications on the storage volume. (9) Storage resource groups aim to maintain consistency across replication relationships. If a storage volume is directly or indirectly added to a system resource group that is the source of a replication relation, then a storage volume of the same size (or bigger) is added to the system resource group that is the target of the replication relation. After this, the source and target storage volumes are added to the consistency group of the replication relation in question. Similarly, if a storage volume is deleted from a system resource group (directly or indirectly), while the replication relation is in session, then we remove the source storage volume from the replication relation with its target storage volume. However, we do not delete the target storage volume from its parent system resource group.

Implementation of system resource groups in a particular managed systems environment creates a policy framework for the environment, with a portion of the overall policy framework residing in each SRG. The policy framework provides a given level of service to be ensured for each element of given SRG. In one embodiment, potential conflicts between policies (in and between SRGs) may be resolved based on (1) inheritance (policy of parents hold good for children), (2) override (policy of children, if any, would override), and (3) append (policy of children is union of both parent and children level policies). Potential conflicts between policies may also be resolved based on a recipe knowledge base that contains knowledge for one or more domains in the environment.

To illustrate conflict resolution, consider the following example. Database "myDB" is deployed in a data center. The database contains three tablespaces: TS1, TS2 and TS3. TS1 contains data. TS1 is composed of storage volumes SV1 and SV2. TS2 contains a log. TS2 also is composed of storage volumes SV3 and SV4. TS3 contains temporary data, and is composed of storage volume SV5. The system administrator defines/creates three SRGs. SRG1 is composed of TS1 (SRG1={SV1, SV2}). SRG1 is associated with resiliency policy of PointInTime (FlashCopy) every six hours. SRG is composed of TS2 (SRG2={SV3, SV4}). SRG2 is associated with resiliency policy of PointInTime (FlashCopy) every one hour. SRG3 is created for the whole database (SRG3={SRG1, SRG2, SV5}). SRG3 is associated with resiliency policy of PointInTime (FlashCopy) every twenty-four hours. In this example, the policy resolution setting PolicyResolution selected by the administrator is Override=YES. As a result, SV5 is flash copied every twenty-four hours. However, SRG1 and SRG2 are flash copied every six hours and every hour, respectively.

SRG creation/definition, deletion and modification events may be published by the system for subscription. This notion helps the interested listeners to be notified in case of creation/deletion/modification of SRG(s) that might be of interest for (1) potential conflict resolution, (2) validation of the managed systems environment, (3) proactive action, (4) user level notification etc., and the like.

Figure 6:
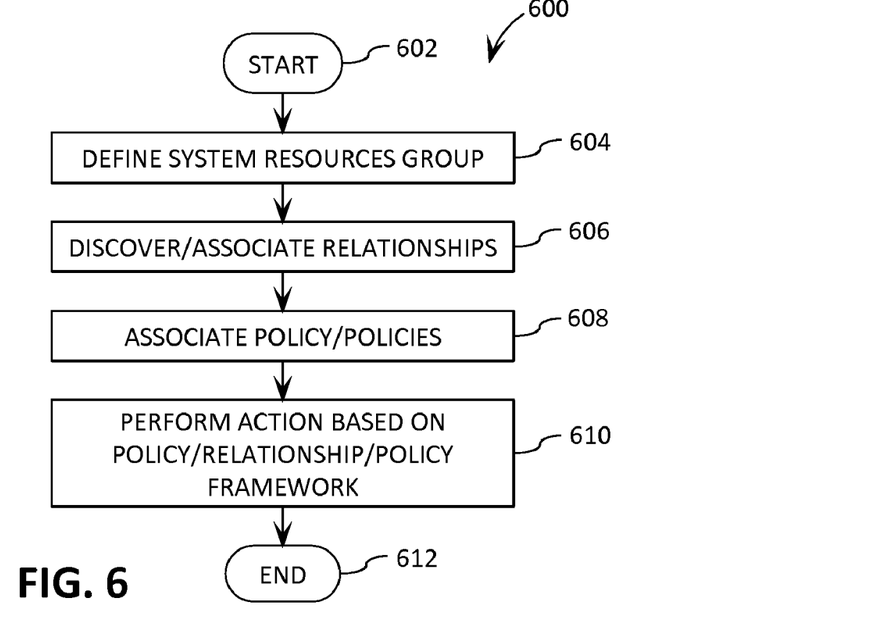
FIG. 6 is a flow chart of an exemplary method for implementing a system resource group (SRG)
Figure 7:
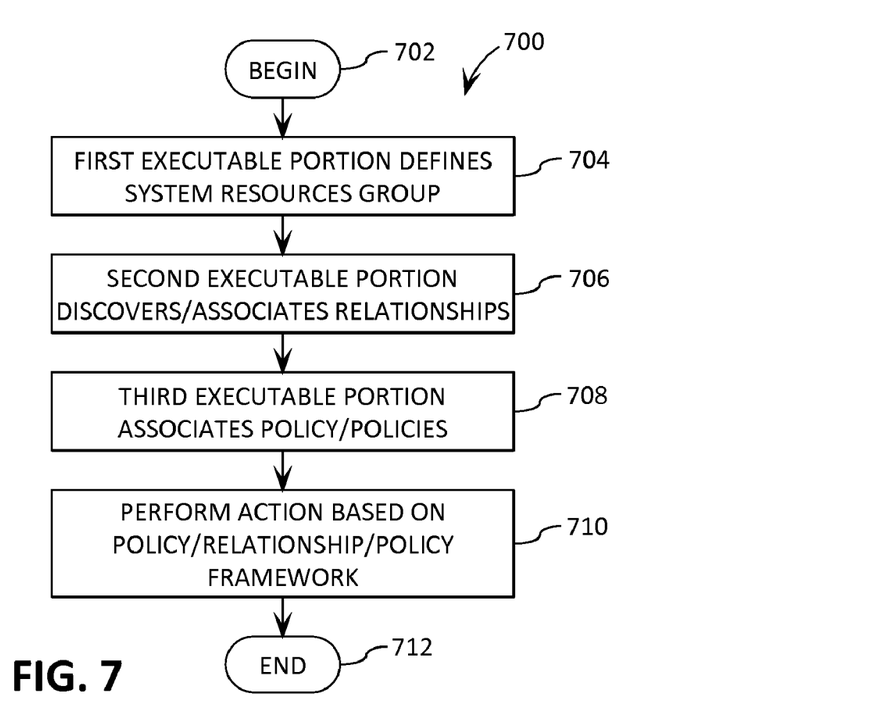
FIG. 7 is a flow chart of an exemplary computer-implemented method for implementing a system resource group (SRG).

Turning to FIGS. 6 and 7, methods 600 and 700 describe exemplary procedures for implementation of SRGs (and thereby establishing policies, correlation, management, and the like within a particular managed systems environment). As one skilled in the art will appreciate, various steps in the methods 600 and 700 may be implemented in differing ways to suit a particular application. In addition, the described methods may be implemented by various means, such as hardware, software, firmware, or a combination thereof operational on or otherwise associated with the storage environment. For example, the methods may be implemented, partially or wholly, as a computer program product including a computer-readable storage medium having computer-readable program code portions stored therein. The computer-readable storage medium may include disk drives, flash memory, digital versatile disks (DVDs), compact disks (CDs), and other types of storage mediums.

Turning first to FIG. 6, method 600 begins (step 602) with the definition/creation of one or more system resources groups (step 604). The system resource groups are subject to at least one membership requirement as previously described. As a next step, the relationships between various entities (within and without a particular SRG) are discovered and associated (step 606). The policy or policies of the particular SRG are then established and associated with the entities assigned to the SRG (step 608). Once the SRG is created/defined, then an action may be performed by, or in conjunction with, the application in which the entities in the managed systems environment are visible (step 610). The application takes into account one of the policies, relationships, and/or policy framework established by the system resource group. The SRG expands according to the context of the action performed as previously described, yet retains basic information, such as, for example, primitive relationships between the entities.

As the skilled artisan will appreciate, the action may vary depending on a particular implementation. For example, the action may relate to provisioning, replication, disaster recovery, chargeback, reporting, orchestration, asset tracking, cluster management, administrator domain functions in data centers, planning, and the like. In one embodiment, the action may relate to performing a group-oriented provisioning action. This group-oriented provisioning action may include creation of a volume, creation of a file system, creation of a database, assignment of a volume from a storage subsystem to a server, assignment of a file system, assignment of a database, and management of an access control (for security purposes). Returning to FIG. 6, as a next step, the method 600 then ends (step 612).

Method 700 describes the steps described previously in FIG. 6, yet in computer-implementable format. Method 700 begins (step 702) with a first executable portion of computer-readable program code defining/creating one or more SRGs (step 704). A second executable portion discovers/associates relationships in similar fashion to step 606 in FIG. 6 (step 706). A third executable portion associates policies in similar fashion to step 608 in FIG. 6 (step 708). Finally, the action is again performed in conjunction with or by the application (step 710). The method 700 then ends (step 712).

A systems administrator may group the entities he/she is using based on his/her administrative domain. These entities may be grouped together by the administrator in an ad hoc fashion without any application boundary to create a SRG. The SRG may then be used for reporting, alert tracking, asset tracking, location tracking, problem determination, etc. In this way, implementation of SRGs serves to facilitate a variety of functionality in systems managed environments.

Some of the functional units described in this specification have been labeled as modules in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices, or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, as electronic signals on a system or network.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for implementing policies for heterogeneous entities in a managed systems environment by a processor device, comprising:
    organizing a plurality of the heterogeneous entities into a system resource group (SRG), each of the plurality of the heterogeneous entities visible to an application operable on the managed systems environment; wherein the system resource group:
        is subject to at least one membership requirement,
        defines a relationship between at least two of the heterogeneous entities,
        contains at least one policy defining an operation as to be performed on the system resource group for a domain of the managed systems environment, and
        defines at least a portion of a policy framework between the system resource group and an additional system resource group organized from an additional plurality of the heterogeneous entities, wherein all of the heterogeneous entities in the managed systems environment are provided a level of service in the policy framework for tiered management; and
    performing an action for one of the heterogeneous entities by the application, wherein the action takes into account at least one of the relationship, the at least one policy, and the at least the portion of the policy framework established by the system resource group, the system resource group expanding according to a context of the action.

2. The method of claim 1, wherein defining the operation as to be performed on the system resource group for the domain of the managed systems environment includes defining at least one of provisioning and replication operations to be performed on the system resource group, and further wherein the at least one of the provisioning and replication operations is performed on either the system resource group or a nearest system resource group measured in terms of a node distance.

3. The method of claim 1, wherein performing the action includes performing a group-oriented provisioning action, a resiliency action, a chargeback action, and a reporting action.

4. The method of claim 3, wherein performing the group-oriented provisioning action includes performing one of creating a volume, creating a file system, and creating a database, and further wherein the at least one policy includes, for the performing the one of creating the volume, creating the file system, and creating the database:
  if an element in an ordered set is the volume, not creating the volume but removing the volume from the ordered set for assignment to a host in the system resource group,
  if the element is a storage pool, the volume is created from the storage pool and made ready for assignment to a host in the system resource group, and
  if the storage pool is empty, removing the storage pool from the ordered set.

5. The method of claim 3, wherein performing the group-oriented provisioning action includes performing one of assigning a volume from a storage subsystem to a server, assigning a file system, assigning a database, and managing an access control.

6. The method of claim 1, wherein the at least one policy defines the operation as to be performed on the system resource group for one of a volume creation, volume assignment, zoning, backup, and replication domain of the managed systems environment.

7. A system for implementing policies for heterogeneous entities in a managed systems environment, comprising:
  a hardware policy management module operational in the managed systems environment, the hardware policy management module adapted for organizing a plurality of the heterogeneous entities into a system resource group (SRG), each of the plurality of the heterogeneous entities visible to an application operable on the managed systems environment; wherein the system resource group:
    is subject to at least one membership requirement,
    defines a relationship between at least two of the heterogeneous entities,
    contains at least one policy defining an operation as to be performed on the system resource group for a domain of the managed systems environment, and
    defines at least a portion of a policy framework between the system resource group and an additional system resource group organized from an additional plurality of the heterogeneous entities, wherein all of the heterogeneous entities in the managed systems environment are provided a level of service in the policy framework for tiered management.

8. The system of claim 7, wherein the hardware policy management module facilitates performing an action for one of the heterogeneous entities by the application, wherein the action takes into account at least one of the relationship, the at least one policy, and the at least the portion of the policy framework established by the system resource group, the system resource group expanding according to a context of the action.

9. The system of claim 7, wherein the hardware policy management module is further adapted for defining at least one of provisioning and replication operations to be performed on the system resource group, and further wherein the at least one of the provisioning and replication operations is performed on either the system resource group or a nearest system resource group measured in terms of a node distance.

10. The system of claim 7, wherein the hardware policy management module is further adapted for facilitating performing a group-oriented provisioning action, a resiliency action, a chargeback action, and a reporting action.

11. The system of claim 7, wherein the hardware policy management module is further adapted for facilitating performing one of creating a volume, creating a file system, and creating a database, and further wherein the at least one policy includes, for the performing the one of creating the volume, creating the file system, and creating the database:
  if an element in an ordered set is the volume, not creating the volume but removing the volume from the ordered set for assignment to a host in the system resource group,
  if the element is a storage pool, the volume is created from the storage pool and made ready for assignment to a host in the system resource group, and
  if the storage pool is empty, removing the storage pool from the ordered set.

12. The system of claim 7, wherein the hardware policy management module is further adapted for performing one of assigning a volume from a storage subsystem to a server, assigning a file system, assigning a database, and managing an access control.

13. The system of claim 7, wherein the at least one policy defines the operation as to be performed on the system resource group for one of a volume creation, volume assignment, zoning, backup, and replication domain of the managed systems environment.

14. The system of claim 7, wherein the heterogeneous entities include at least one of a virtual server, a physical server, a file system, a database, a logical volume, and a physical volume.

15. The system of claim 7, wherein the system resource group includes the additional system resource group.

16. The system of claim 7, wherein the managed systems environment includes a storage attached network (SAN) storage subsystem.

17. A computer program product for implementing policies for heterogeneous entities in a managed systems environment, the computer program product comprising a non-transitory computer-readable storage medium having computer-readable program code portions stored therein, the computer-readable program code portions comprising:
  a first executable portion for organizing a plurality of the heterogeneous entities into a system resource group (SRG), each of the plurality of the heterogeneous entities visible to an application operable on the managed systems environment; wherein the system resource group:
    is subject to at least one membership requirement,
    defines a relationship between at least two of the heterogeneous entities,
    contains at least one policy defining an operation as to be performed on the system resource group for a domain of the managed systems environment, and
    defines at least a portion of a policy framework between the system resource group and an additional system resource group organized from an additional plurality of the heterogeneous entities, wherein all of the heterogeneous entities in the managed systems environment are provided a level of service in the policy framework for tiered management.

18. The computer program product of claim 17, further including a second executable portion for facilitating performing an action for one of the heterogeneous entities by the application, wherein the action takes into account at least one of the relationship, the at least one policy, and the at least the portion of the policy framework established by the system resource group, the system resource group expanding according to a context of the action.

19. The computer program product of claim 17, wherein defining the operation as to be performed on the system resource group for the domain of the managed systems environment includes defining at least one of provisioning and replication operations to be performed on the system resource group, and further wherein the at least one of the provisioning and replication operations is performed on either the system resource group or a nearest system resource group measured in terms of a node distance.

20. The computer program product of claim 17, wherein the at least one policy defines the operation as to be performed on the system resource group for one of a volume creation, volume assignment, zoning, backup, and replication domain of the managed systems environment, and further wherein the at least one policy includes, for performing the volume creation:

if an element in an ordered set is the volume, not creating the volume but removing the volume from the ordered set for assignment to a host in the system resource group, if the element is a storage pool, the volume is created from the storage pool and made ready for assignment to a host in the system resource group, and if the storage pool is empty, removing the storage pool from the ordered set.

* * * * *